Patented Nov. 25, 1930

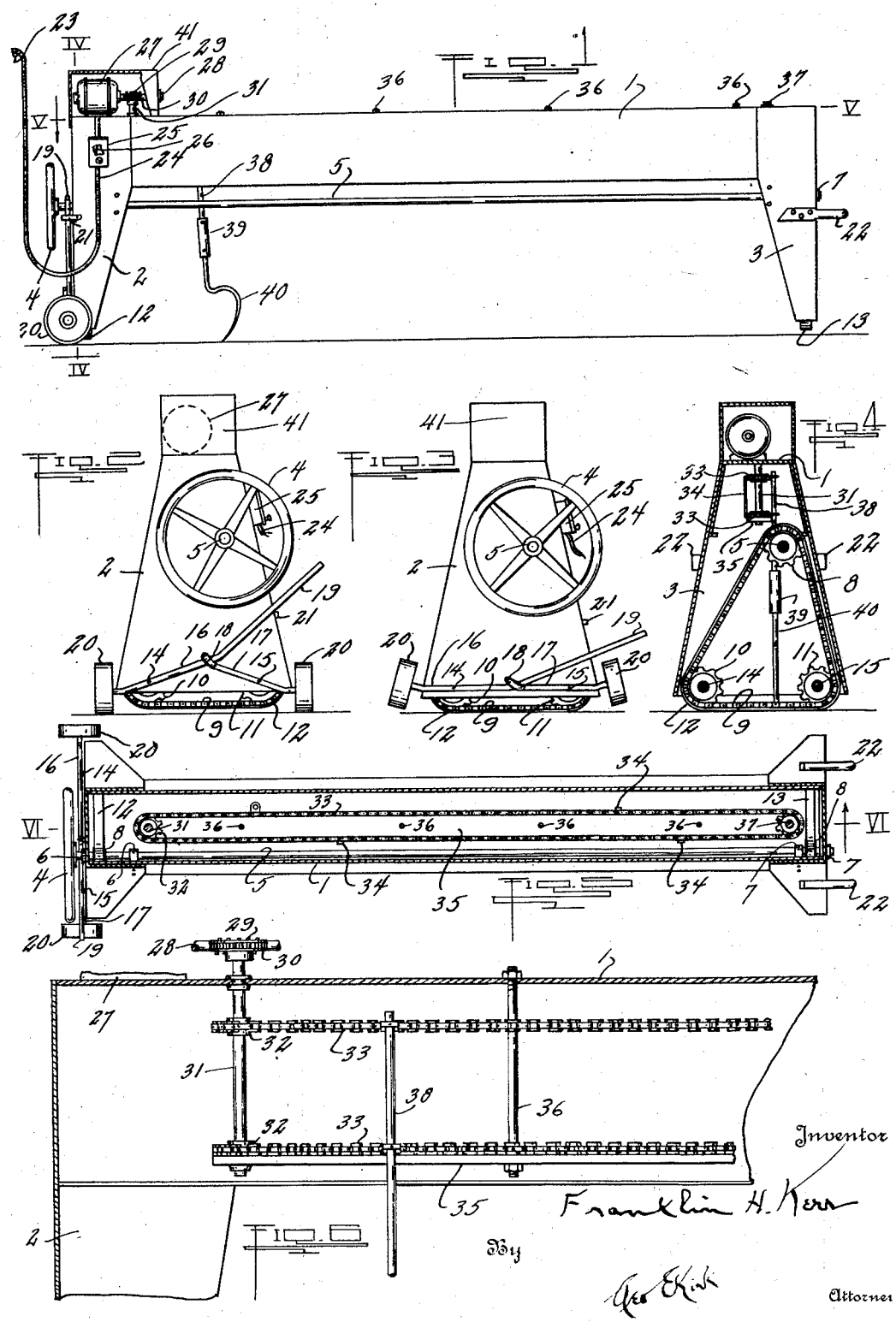

1,782,690

UNITED STATES PATENT OFFICE

FRANKLIN H. KERR, OF TOLEDO, OHIO

AGRICULTURAL TOOL

Application filed April 28, 1927. Serial No. 187,210.

This invention relates to portable mechanism for determining reciprocatory traverses as to a path of travel for said mechanism especially for performing an operation of work resulting from such travel.

This invention has utility when incorporated as a self-contained cultivation or crop care apparatus wherein a tool as a harrow or cultivator knife may be operated in parallel straight lines alternately in opposite directions as between rows of vegetables such as radishes, lettuce, turnips, beets, corn, tobacco, cabbage, carrots, tomatoes, celery, potatoes, onions, etc.

Referring to the drawings:

Fig. 1 is a side elevation, with parts broken away, showing an embodiment of the invention as a power operated garden tool or land care device;

Fig. 2 is an end elevation from the left of Fig. 1, with the device in position to be shifted out of cultivator position;

Fig. 3 is a view similar to Fig. 2, with the device set down to cultivator position;

Fig. 4 is a section on the line IV—IV, Fig. 1;

Fig. 5 is a section on the line V—V, Fig. 1; and

Fig. 6 is a partial section on the line VI—VI, Fig. 5.

Bridge frame or inverted channel 1 is shown with channel legs or supports 2, 3. Adjacent the support 2 is hand wheel 4 mounted on shaft 5 carried in bearings 6, 7, of the respective supports 2, 3. Mounted on this shaft 5 near the respective supports 2, 3, are sprocket wheels 8, about which extend sprocket chains 9 over rollers 10, 11, for these sprocket chains 9 to provide a horizontal apron reach as a movable carrier 12 at the support 2 and as a movable carrier 13 projecting below the support 3. It is accordingly seen upon rotation of the hand wheel 4 in one direction, the bridge 1 may be moved sidewise in one direction, while opposite direction of rotation of the hand wheel 4 will effect reverse sidewise movement.

The support 2 has axles 14, 15, for the rollers or wheels 10, 11, protruding from the support and providing bearings for levers 16, 17. The lever 17 has eye portion 18 extending over the lever 16. Upwardly from this slip connection, the lever 16 is provided with handle 19. These levers 16, 17, have loosely mounted on their lower terminals rollers 20. Upon thrusting handle 19 downward, these rollers 20 are lifted out of sustaining position for the support 2 shown in Fig. 3. By lifting the handle upward, the toggle relation of the levers 16, 17, is broken, and the rollers 20 are thrust into sustaining position shown in Fig. 2.

Shiftable catch 21 on the support 2 may hold this handle 19 into position for maintaining the rollers 20 in such sustaining position. With the support 2 thus clear, handles 22, at the support 3, may be engaged and this bridge shifted longitudinally similar to wheel barrow operation in locating this device as desired upon the portion of the garden or other region which it is desired to give attention or maneuvering the device to the field.

In locating the device for use afield, for working over a region which may approximate distance between the supports 2, 3, the bridge 1 may be aligned with such region for traverse of the bridge. To this end, the handle 19 is then lowered to shift the rollers 20 out of sustaining position and leave the aprons 12, 13, in sustaining position for the respective supports 2, 3.

Messenger cable 23 carries electric conductor lines 24 which may extend to switch box 25 there to have switch 26 operated for starting motor 27 mounted on the bridge or frame 1, adjacent the support 2. This motor 27 is an actuator for the tool and is shown as having shaft 28 carrying worm 29 in mesh with worm wheel 30 on vertical shaft 31. This vertical shaft 31 is provided with a pair of sprocket wheels 32 about which extend sprocket chains 33 in providing an endless link belt connected at intervals by bars 34. Additionally, sustaining plate 35 mounted by bolts 36 may provide way for the lower chain 33 as well as locate bearings for the lower portion of the shaft 31 and follower shaft 37.

The bars 34 maintain the upper sprocket chain 33 from sagging and insure travel of the two sprocket chains 33 simultaneously. Additionally, one or more bars 38 may be mounted intermediately of the bars 34. These bars 38 may have sleeve connections 39 for detachably mounting cultivator tools 40 of a desired character. These bars 28 thus serve as tool carriers and make a circuit over to the support 3 and back to the support 2 for giving the sprocket chains 33 effectiveness as automatic reversing means for the tool. These tools 40 may be removed readily and substituted for different tools or for sharpening or adjustment as to the sleeves 39. Furthermore, in some instances of transportation it may be preferable to remove the tool 40. The motor 27 is protected from weather by supplemental housing 41.

In practice, the frame comprising the bridge 1 with supports 2, 3, may be wheeled on rollers 20 to the desired location afield. The handle 19 may then be tripped for positioning the bridge across the region to be given attention. The actuator for the tool is rendered effective by cutting in the motor 27, the tool or tools 40 may travel from the support 3 to the support 2, and back to the support 3 in a reverse travel at a common positioning of the frame. In the reversal by this automatic reversing means for the tool, the offset travel is the distance between the reaches of the sprocket chains 33 horizontally. This may be the width for the growing material in the row, or it may be the distance the tool 40 in the travel over and back will operate in a region for both courses between a row. The circuit may be once for a shallow cultivation, while if a more deep cultivation is desired, the tool may repeat. If the ground to be cultivated is for loosening up before seeding, the stepping forward or progress of the tool may be more or less gradual as controlled by the hand wheel 4 either by stopping the motor 27 between steps or allowing the tool still to travel.

By the operation of the hand wheel 24 there may be definite location of the reciprocation travel of the cultivator tools between the supports 2, 3. These supports may be of a convenient spacing for the desired installation. In producing this frame of say fourteen or sixteen gage sheet metal and with sixteen to twenty foot bridge span, the entire apparatus may weigh as little as one hundred or one hundred and twenty-five pounds including the motor. Accordingly, the device is readily portable to a range of locations making it especially adaptable for intensive gardening operations or for small gardens.

What is claimed and it is desired to secure by Letters Patent is:

1. A pair of supports, a connecting frame therebetween, a tool depending from the frame, and means for traversing the tool between the supports including an endless belt and vertical axis wheels for the belt.

2. A pair of supports, a connecting frame therebetween, a tool depending from the frame, and means carried by the support for traversing the tool along the frame including an endless belt and vertical axis wheels for the belt.

3. A pair of supports, a connecting frame therebetween determining a directing way, a tool carrier directed by the way, and means carried by the support for propelling the carrier to and fro along said frame including an endless belt and vertical axis wheels for the belt.

4. A land care tool comprising a bridge frame, a support for the bridge frame, and a pair of independent axis rollers shiftable relatively to said support for thereby bringing the rollers from idle position to sustain the frame for longitudinal anti-friction shifting thereof.

5. A land care tool comprising a bridge frame, a support for the frame, an apron protruding below the support, mounting means for the apron holding the apron fixed with the frame, operating means for the apron transversely of the frame, wheels disposed transversely of the apron, and shifting means for the wheels as to the support for location below the support to render the apron ineffective as a sustaining means for the support.

6. A frame, a reciprocable tool carrier operable along said frame, a pair of supports for the frame, an endless belt for the carrier along said frame, vertical axis wheels for the belt, and driving means for one of the wheels.

7. A frame, a reciprocable tool carrier operable along said frame, including an endless belt and vertical axis wheels for the belt, a pair of supports for the frame, and a drive for the carrier.

8. A frame, a reciprocable tool carrier operable along said frame for the land care operation, said carrier including an endless belt and a pair of vertical axis wheels for the belt, a pair of supports for the frame, and a pair of sustaining means adjustable as to each support for varying the clearance of the frame from the ground upon which the frame may be operable.

In witness whereof I affix my signature.

FRANKLIN H. KERR.